US008595506B2

(12) United States Patent
Robshaw et al.

(10) Patent No.: US 8,595,506 B2
(45) Date of Patent: Nov. 26, 2013

(54) AUTHENTICATION SYSTEM AND METHOD USING ELECTRONIC TAGS

(75) Inventors: Matthew Robshaw, Paris (FR); Henri Gilbert, Bures sur Yvette (FR)

(73) Assignee: France Telecom, Paris (FR)

( * ) Notice: Subject to any disclaimer, the term of this patent is extended or adjusted under 35 U.S.C. 154(b) by 549 days.

(21) Appl. No.: 12/741,638

(22) PCT Filed: Nov. 21, 2008

(86) PCT No.: PCT/EP2008/066020
§ 371 (c)(1),
(2), (4) Date: May 6, 2010

(87) PCT Pub. No.: WO2009/065941
PCT Pub. Date: May 28, 2009

(65) Prior Publication Data
US 2010/0228986 A1 Sep. 9, 2010

(30) Foreign Application Priority Data
Nov. 23, 2007 (EP) .................................... 07301579

(51) Int. Cl.
*G06F 21/00* (2013.01)
(52) U.S. Cl.
USPC ........................................................ 713/182
(58) Field of Classification Search
USPC ................... 713/159, 168, 170, 182; 340/5.8; 708/250; 380/46, 270
See application file for complete search history.

(56) References Cited

U.S. PATENT DOCUMENTS

| 7,233,664 | B2 * | 6/2007 | Soliman ........................ 380/44 |
| 2004/0222878 | A1 | 11/2004 | Juels |
| 2005/0180315 | A1 * | 8/2005 | Chitrapu et al. .............. 370/208 |
| 2005/0210251 | A1 * | 9/2005 | Nyberg et al. ................ 713/169 |
| 2006/0087407 | A1 * | 4/2006 | Stewart et al. ............. 340/10.52 |
| 2010/0228986 | A1 * | 9/2010 | Robshaw et al. ............. 713/182 |
| 2011/0107102 | A1 * | 5/2011 | Canard et al. ................ 713/170 |

FOREIGN PATENT DOCUMENTS

WO WO 2007/075947 A2 5/2007

OTHER PUBLICATIONS

Calmels et al., "Low-Cost Cryptography for Privacy in RFID Systems," Smart Card Research and Advanced Applications Lecture Notes in Computer Science, LNCS, Springer-Verlag, BE, vol. 3928, pp. 237-251 (2006).

(Continued)

*Primary Examiner* — Hadi Armouche
(74) *Attorney, Agent, or Firm* — Drinker Biddle & Reath LLP

(57) ABSTRACT

An authentication method of a prover device by a verifier device using cryptographic coupons is provided, where a coupon includes a pseudo-random number $r_i$, where i is an index for labeling the coupon, and a reduced-coupon $x_i$ such that $x_i = f(r_i)$, where $f$ is a predetermined one-way function, the method including the following steps: the verifier device sends a challenge consisting of a random value c to the prover device; the prover device sends to the verifier device a response y calculated by using the pseudo-random number $r_i$, the challenge c, and a secret key s belonging to the prover device; and the verifier device checks the validity of the response y based on the challenge c, the reduced-coupon $x_i$ corresponding to the pseudo-random number $r_i$, and a public key V corresponding to the secret key s, the reduced-coupon $x_i$ being received by the verifier device from a source external to the prover device.

19 Claims, 1 Drawing Sheet

(56) References Cited

OTHER PUBLICATIONS

McLoone et al., "Public Key Cryptography and RFID Tags," Topics in Cryptology—CT-RSA 2007 Lecture Notes in Computer Science, LNCS, Springer-Verlag Berlin Heidelberg, vol. 4377, pp. 372-384 (Feb. 7, 2007).

National Institute of Standards and Technology, "Digital Signature Standard (DSS)," Federal Information Processing Standards Publication, FIPS 186-2, pp. 1-70 (Jan. 27, 2000).

National Institute of Standards and Technology, "Advanced Encryption Standard (AES)", Federal Information Processing Standards Publication, FIPS 197, pp. 1-47 (Nov. 26, 2001).

Rivest et al., "A Method for Obtaining Digital Signatures and Public-Key Cryptosystems," Communications of the ACM, vol. 21 (2), pp. 120-126 (Feb. 1978).

\* cited by examiner

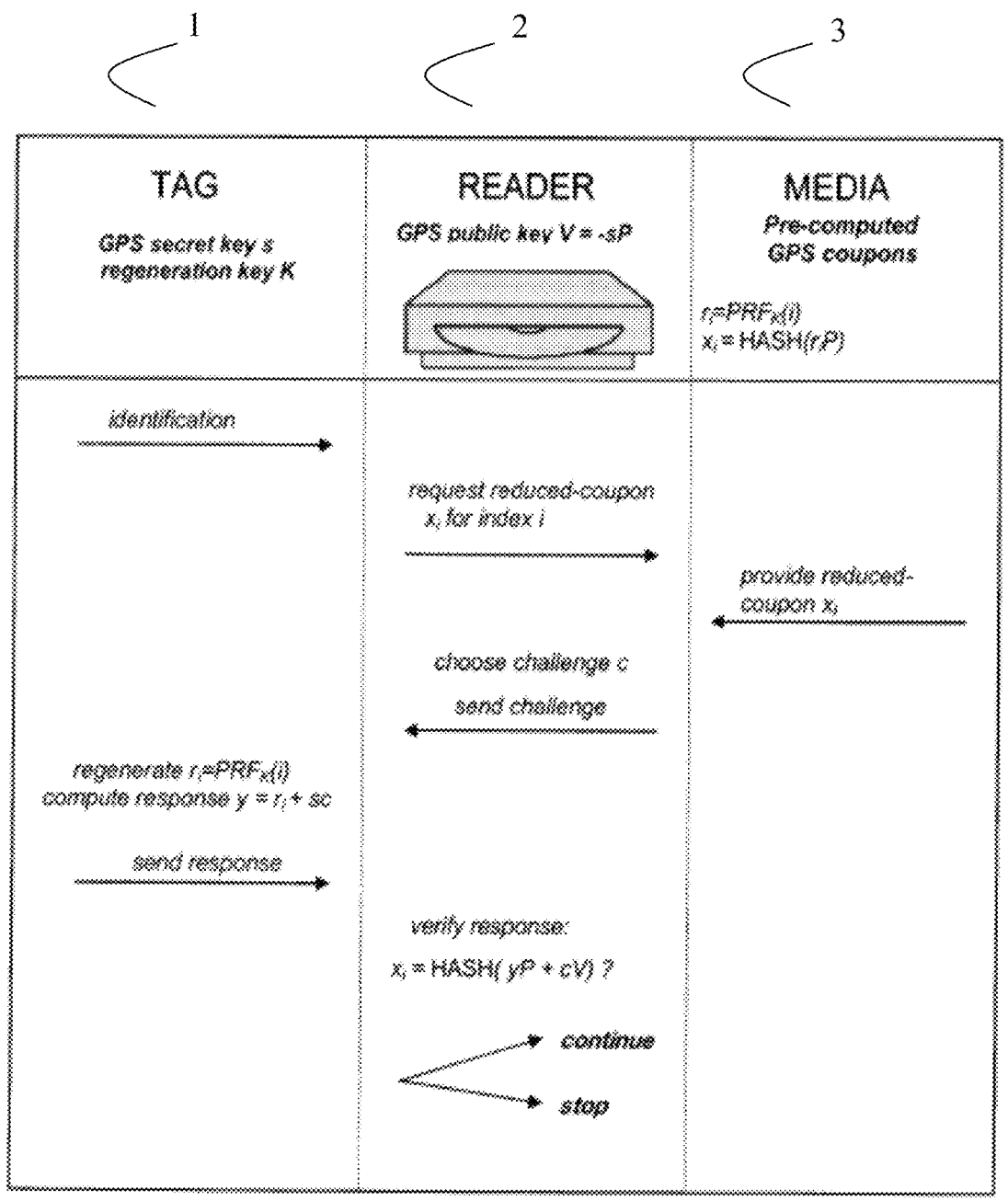

AUTHENTICATION SYSTEM AND METHOD USING ELECTRONIC TAGS

CROSS-REFERENCE TO RELATED APPLICATIONS

This application is the U.S. national phase of the International Patent Application No. PCT/EP2008/066020 filed Nov. 21, 2008, which claims the benefit of the European Patent Application No. 07301579.4 filed Nov. 23, 2007, the entire content of which is incorporated herein by reference.

FIELD OF THE INVENTION

The present invention generally relates to an authentication system and method typically applicable to Digital Rights Management. More particularly, it provides a method and a system for authenticating digital-content storage means by using an electronic tag (also known as "Radio-Frequency Identification", or RFID, tag).

BACKGROUND

In the context of the deployment of telecommunication networks and audiovisual services, the distribution of digital contents is getting more and more problematic in terms of intellectual-property rights. Indeed, copying of large-size digital files, and large-scale distribution of digital files, has become both easy and practically costless for individuals. Therefore, industries whose profit derives from the sales and distribution of digital data (such as music, video, electronic books, videogames, and so on) need protecting those data against uses which do not obey the rules set down in commercials agreements between providers and consumers of digital content. Such protection systems are called "Digital Rights Management" (DRM).

Simple CD and DVD authentication schemes rely on human assessment, e.g., by observing the quality and integrity of the packaging and the presentation of a product. More sophisticated mechanisms that are sometimes used in digital-content distribution make use of advanced printing techniques to resist forgery and duplication, and/or certificates of purchase, and/or the use of registration numbers on the packaging of a product. Such a registration number may be linked to the specific copy of the digital-content storage means, it can be verified during the installation process or it may be checked online.

Such techniques however assume that the registration number is only available to the legitimate owner of the digital-content storage means. If the registration number is supplied by the legitimate recipient to some other user to go with an illicit copy of these storage means, then authenticity checks that depend on the action of the user are of little use.

There are two known ways (possibly used in conjunction with one another) to resist forgery or unauthorized duplication of a product; the first is to make the content inaccessible (i.e. encrypted) so that copied content is unintelligible, while the second is to provide a process of authentication for the storage means (for example, a CD or a DVD) of the digital content, so that only after authentication has been successful can the content be accessed.

A known content-protection system using encryption works as follows. Each device manufacturer provides a copy of a secret machine-specific key to the content distributors. When content is printed on a CD, the content is encrypted using a secret session key s. This key s is then in turn encrypted under every device manufacturer key m and the results $ENC_m(s)$ are stored on the CD. At the time of playing the CD, the necessary encrypted session key $ENC_m(s)$ is selected from the disc and the content encryption key s, and hence the content, is recovered. The security of the scheme, the protection of the content and the authentication of the disc, depends on the fact that:

each device manufacturer shares a secret key with the content distributors;

the encrypted copies of the per-disc content keys $ENC_m(s)$ are stored on the CD in such a way that they cannot be copied by a malicious user; a part which cannot be copied of the CD playing surface is used for that purpose.

The main limitation of such schemes is that symmetric keys have to be managed and shared by the device manufacturers and the content distributors. Given the difficulty of upgrading the keys in devices that are already commercialized, and the increased level of exposure due to having symmetric keys deployed at several different sites, such encryption schemes are rather inconvenient.

Some classically known solutions for authentication of a "prover" entity by a "verifier" entity are based on symmetric-key algorithms such as the well-known "Advanced Encryption Standard" AES (Standard FIPS 197 published by the *National Institute of Standards and Technology*); but such solutions suffer from the above-mentioned limitations of managing and sharing symmetric keys. Some other known solutions for authentication are based on public-key algorithms, such as DSA ("Digital Signature Algorithm", Standard FIPS 186-2 published by the *National Institute of Standards and Technology*) or RSA (for a detailed description of RSA, see the article by R. L. Rivest, A. Shamir, and L. M. Adleman titled "*A Method for Obtaining Digital Signatures and Public-key Cryptosystems*", Communications of the ACM, pages 120-126, volume 21, number 2, 1978). These classical solutions, whether based on symmetric keys or on public-key, are however inconvenient because they require additional circuitry in the verifier device, and furthermore require intensive computations, which implies that the verifier device must operate with a powerful (crypto-)processor.

Some other known authentication algorithms, by contrast, can be used in such a manner that some device which is relatively less powerful (computationally speaking) plays the role of the prover, and a more powerful device plays the role of the verifier. Such algorithms are of particular interest to deployments that use computationally-weak prover devices such as RFID tags communicating with much more powerful verifier devices such as tag-readers. An example of such a cryptographic algorithm is the GPS algorithm (for a detailed description of several variants of GPS, see for example International Standards ISO/IEC 9798-5 and 14888-2).

As is well-known in the art, one way to reduce computations in a device during an authentication protocol is—whenever applicable—by the use of cryptographic "coupons". A coupon comprises, first, a randomly chosen number r and, second, a "reduced-coupon" x such that $x = f(r)$, where $f$ is a one-way function the calculation of which requires intensive computations (such as modular exponentiations). An example of such a cryptographic algorithm is DSA, wherein $x = (g^r \mod p) \mod q$, where p and q are prime numbers and g is an integer derived from p and q; another example is a particular variant of GPS, wherein $x = g^r \mod n$, where n is a large integer, and g is an integer (typically much) smaller than n. Whenever a computationally-weak prover device takes part in a cryptographic protocol using such an algorithm, it may use a coupon in order to reduce computations, thereby significantly reducing the duration of the protocol.

Usually, a set of coupons (r,x) is loaded in the coupon-consuming device during the device fabrication process. Once this set of coupons has been consumed, one may either simply throw away the device if its cost of fabrication is low enough, or have the coupon-consuming device itself compute a new set of coupons, or else have a computationally-powerful device compute a new set of coupons which are then loaded in the coupon-consuming device.

However, it must be born in mind that the number of successive protocols in which a coupon-consuming device can enter is limited by the amount of memory required for storing the coupons. It is hence desirable to reduce the amount of memory occupied by each coupon. Such an improvement is actually known: it consists in storing in the coupon-consuming device during the fabrication process a set of reduced-coupons $x_i = f(r_i)$ (where i is an index for labeling the coupon), but not the corresponding random numbers $r_i$, which are, instead, successively (viz., keeping with successive values of the index i) regenerated in the device whenever needed for taking part in a cryptographic protocol. This may be achieved for example by having the device calculate $r_i = PRF_K(i)$, where K is a "regeneration key" owned by the device, and PRF is a keyed pseudo-random function the calculation of which requires only light computations.

One may then consider the possibility of reloading a coupon-consuming device with a set of reduced-coupons, by connecting it to a computationally-powerful reloading device. Such a solution has however never been implemented, because the communications environment is, in most practical deployments, insufficiently secured. There exists indeed a danger that a device may inadvertently request reloading from a fake or compromised coupon-reloading device, which will attempt to provide phony, arbitrarily chosen "reduced-coupons". Since an attacker does not know the secret key K used in the calculation of the pseudo-random function $PRF_K$, it is unable to calculate the pseudo-random numbers $r_i = PRF_K(i)$; thus, any such "reduced-coupon" subsequently used by the coupon-consuming device during a cryptographic protocol with a verifier device, will be computationally unrelated to the number $r_i$ concurrently used. This amounts to a so-called "denial-of-service" attack, since it essentially disrupts the regular operation of the coupon-consuming device after reloading.

SUMMARY

Therefore, in a first aspect of the present invention, an authentication method of a prover device by a verifier device by means of cryptographic coupons is provided for, wherein a coupon comprises, on one hand, a pseudo-random number $r_i$, where i is an index for labeling the coupon, and, on the other hand, a reduced-coupon $x_i$ such that $x_i = f(r_i)$, where $f$ is a predetermined one-way function, comprising at least the following steps:
   the verifier device (2) sends a challenge consisting of a random value c to the prover device (1),
   the prover device (1) sends to the verifier device (2) a response y calculated by using a pseudo-random number $r_i$, said challenge c, and a secret key s belonging to the prover device (1), and
   the verifier device checks the validity of said response y based on the challenge c, the reduced-coupon $x_i$ corresponding to said pseudo-random number $r_i$, and a public key V corresponding to said secret key s.
According to the invention, the verifier device (2) receives said reduced-coupon $x_i$ from a source (3) external to the prover device (1).

Thus, according to the present invention, the verifier device (comprising an RFID tag reader for example) obtains the reduced-coupons, not from the prover device (RFID tag for example) as in the prior art, but from an external source. This source can most conveniently be the digital-content storage means itself (such as a CD, or a DVD) which needs protection against unauthorized copying, and on which the prover device may be physically attached (for example, the prover device can be an RFID tag either affixed to a DVD, or attached to a sales receipt delivered to the purchaser of a DVD). In another embodiment of the invention, the external source is a streaming media to which the verifier device can be connected, such as a telephone connection. In yet another embodiment of the invention, the external source is an Internet Web site to which the verifier device can be connected.

Since (as is well-known in the art) it is extremely difficult in practice to make an exact copy of an RFID tag, even for a relatively sophisticated and well-equipped attacker, and since the reduced-coupons need not be encrypted for the authentication method to be valid, the present invention provides a very convenient authentication method of a digital-content storage means (such as a CD, or a DVD) by an appropriate reader (such as a CD- or DVD-reader). Most conveniently, the number of such authentications for a given RFID tag can be huge, since the limitations on this number no longer depend on the storage capabilities of a tag as in the prior art, but, for example, on the enormously superior storage capacities of a DVD.

In a second aspect of the present invention, a digital-content storage means is provided. This storage means (for example, a CD or DVD disc) stores payload digital content (for example, music or video) and at least one reduced-coupon.

In a third aspect of the present invention, a portable object capable of exchanging data with a verifier device is provided. This portable object is capable of executing, as the prover device, a method as succinctly described above. It may comprise an electronic circuit containing a processor and a memory, or it may comprise an ASIC (Application Specific Integrated Circuit). In particular, as explained above, this portable object can advantageously be an RFID tag.

In a fourth aspect of the present invention, a verifier device capable of exchanging data with a portable object is provided. This verifier device comprises a data-processing device programmed for implementing a method as succinctly described above. In particular, as explained above, this verifier device can advantageously comprise an RFID-tag reader.

In a fifth aspect of the present invention, a digital-content storage-means reader is provided. This reader (for example, a CD- or DVD-reader) comprises a verifier device as succinctly described above.

In a sixth aspect of the present invention, a system for cryptographic authentication is provided. This system comprises a portable object, a verifier device and a source of reduced-coupons external to said portable object.

In a seventh aspect of the present invention, non-removable, or partially or totally removable data storage means are provided. These data storage means contain electronic data-processing program code instructions for executing the steps of a method as succinctly described above.

Finally, in an eighth aspect of the present invention, a computer program is provided. This computer program contains instructions such that, when said program controls a programmable data-processing device, said instructions cause said data-processing device to execute a method as succinctly described above.

The advantages of this portable object, this verifier device, this digital-content storage means, this digital-content storage-means reader, this system, this data storage means and this computer program are essentially the same as the advantages of the method according to the invention.

BRIEF DESCRIPTION OF THE DRAWINGS

The invention will be explained more fully below in connection with particular embodiments provided as non-limitative examples, and with reference to the drawing of FIG. 1, which shows an exemplary authentication method according to the invention.

DETAILED DESCRIPTION

FIG. 1 shows, as an exemplary illustration, the authentication of an RFID tag 1, owning a secret key s and a corresponding public key V, by a verifier device 2 comprising a tag-reader. The tag 1 may for example be affixed on a DVD 3, and the verifier device 2 may be part of a DVD-reader.

A large set of couples $(r_i, x_i)$ have been pre-computed, each couple comprising a pseudo-random number $r_i$ and a corresponding reduced-coupon $x_i = f(r_i)$.

The pseudo-random number $r_i$ is, in the present embodiment, calculated according to $r_i = PRF_K(i)$, where PRF is a keyed pseudo-random function and K is a "regeneration key". This regeneration key K may be entirely distinct from said secret key s, or it may be derived from it.

The cryptographic algorithm used will for example be a known variant of GPS. According to this variant, the one-way function $f$ is such that $x_i = HASH(r_i \cdot P)$, where P denotes a point on a predetermined elliptic curve known as a "generator", (n·P) denotes adding the point P to itself n times using elliptic-curve addition, and HASH denotes a cryptographic hash function such as the Secure Hash Standard SHA-1 (Standard FIPS 180-2 published by the *National Institute of Standards and Technology*). Furthermore, the tag's public GPS key is given by $V = -s \cdot P$.

It should be emphasized that the reduced-coupons thus pre-computed are then stored not on the prover 1 (tag RFID in the present example) as in the prior art, but in an external source 3 according to the invention (the DVD itself for example). Preferably, the reduced-coupons belong to different sets each dedicated to a specific prover, in which case the reduced-coupons are stored along with some predetermined identifier ID, or with the public key V, of the associated prover.

In a first step of the authentication protocol, the tag 1 gets identified by the verifier device 2. Thus, the verifier device 2 knows which public key it has to use during the upcoming authentication process.

In one embodiment, the tag 1 contains its public key V, and sends it to the verifier device 2.

In another embodiment, all the public keys of a set of tags (each associated to a respective DVD) are available from another channel 4 (not shown on FIG. 1). This channel 4 can for example be each of the DVD's produced in one same pressing. As a variant, this channel 4 can be an Internet Web site or a streaming media to which said verifier device 2 can be connected. In this embodiment, whatever the particular variant, each tag contains an identifier ID, so that when the tag sends its ID to the verifier-device, the latter can recover the corresponding public key V from said channel 4.

The tag 1 also sends to the verifier device 2 a previously unused value of index i. As a variant, it is the verifier device 2 who selects this new value of index i.

In a second step of the authentication protocol, the verifier device 2 sends to the DVD-reader the new value of index i along with a request for the corresponding reduced-coupon $x_i$ stored (according to the present embodiment) on the DVD 3. The verifier device 2 then receives this reduced-coupon $x_i$ in reply.

It should be noted that this second step replaces the classical so-called "commitment" step, wherein a prover device sends to a verifier device, for some predetermined value of index i, the corresponding reduced-coupon $x_i$ stored in this prover device.

In a third step, the verifier device 2 sends to the tag 1 a random value c (so-called "challenge"). If, at the end of the first step above, it is the verifier device 2 who selected the new value of index i, the verifier device 2 now also sends this value of index i to the tag 1.

In a fourth (classical) step, the tag 1 generates the number $r_i$ through $r_i = PRF_K(i)$. Advantageously, one can nowadays efficiently implement a pseudo-random function in an electronic device by means of a circuit of fairly small size. This pseudo-random function may conveniently be implemented in the tag 1 by means of a low-cost block cipher algorithm. Alternatively, it might be implemented as a stream cipher algorithm using the regeneration key K as a seed, and the labeling index i as an initialization vector (it will be recalled here that an "initialization vector" is a parameter allowing one to re-use several times the same seed in order to generate several distinct pseudo-random suites).

The tag 1 next sends to the verifier device 2 a value $y = r_i + s \cdot c$ (so-called "response"), where s is the tag's secret (also called "private") GPS key.

Finally, in a fifth (classical) step, the verifier device 2 checks whether $x_i = HASH(y \cdot P + c \cdot V)$.

(In an equivalent GPS variant, one may use instead the following set of equations: $V = +s \cdot P$, $y = r_i - s \cdot c$, and $x_i = HASH(y \cdot P - c \cdot V)$.)

In case the verification is positive, the DVD on which the tag is affixed (to keep with our example) is determined as being genuine, and the DVD-reader will be allowed to read this DVD. Otherwise, it will not, and an error signal may then be generated.

To conclude, we evaluate how much storage capacity might be required in order to store the reduced-coupons for the application of the invention to the authentication of a digital-content storage means such as a CD or DVD disc.

There are three factors involved: the size of the coupons, the number of users that we wish to accommodate on a single pressing, and the number of times that we expect each user might want to authenticate his disc.

For the first factor, depending on the security level, one requires, say, around $2^6$ bits per reduced-coupon. Let us assume that the information printed on each disc is the same for all the discs belonging to a same pressing. One can imagine that each disc pressing yields 10,000 (viz., approximately $2^{13}$) discs, and so this will be the number of users. If users were to authenticate every time the disc is played for the first time on any day over an entire year, then the average user would authenticate between $2^8$ and $2^9$ times. This gives a total of around $2^{27}$ bits, which represents around 3% of the storage capacity of a CD, 0.3% of the storage capacity of a DVD, and around 0.15% of the capacity of a dual-layer DVD.

Of course the numbers may fluctuate in a number of ways. One can imagine having a low-circulation CD containing, say, high-value promotional material for 1000 people. In this case, one may want to authenticate very often, but the number of potential users is low. Users may, alternatively, only be allowed to authenticate once—the first time the disc is played—, or distributors may only care about the first few months in the life of a disc so that popular releases are to be authenticated during, say, only the first two months after a new release. Also, the storage capacities of digital-content storage means will increase as technology progresses, which will make things even better.

Thus, it appears that reduced-coupon storage according to the present invention comes at a cost, but a fairly small one.

The invention claimed is:

1. An authentication method of a prover device by a verifier device using cryptographic coupons, wherein a coupon comprises, on one hand, a pseudo-random number $r_i$, where i is an index for labeling the coupon, and, on the other hand, a reduced-coupon $x_i$ such that $x_i = f(r_i)$, where $f$ is a predetermined one-way function, the method comprising:
   sending, from the verifier device to the prover device, a challenge consisting of a random value c,
   sending, from the prover device to the verifier device, a response y calculated by using the pseudo-random number $r_i$, said challenge c, and a secret key s belonging to the prover device, and
   checking, by the verifier device, the validity of said response y based on the challenge c, the reduced-coupon $x_i$ corresponding to said pseudo-random number $r_i$, and a public key V corresponding to said secret key s,
   wherein the verifier device receives said reduced-coupon $x_i$ from a source external to the prover device.

2. The method according to claim 1, wherein said source is a digital-content storage medium physically associated to said prover device.

3. The method according to claim 1, wherein said source is an Internet Web site or a streaming media to which said verifier device is connected.

4. The method according to claim 1, wherein the prover device contains the public key V, and sends the public key V to the verifier device.

5. The method according to claim 1, wherein the prover device sends an identifier to the verifier device, and that said public key V is available to the verifier device from another channel.

6. The method according to claim 5, wherein said other channel is a digital-content storage medium physically associated to said prover device, or is an Internet Web site or a streaming media to which said verifier device is connected.

7. The method according to claim 1, wherein said value of index i is selected by the prover device.

8. The method according to claim 1, wherein said value of index i is selected by the verifier device.

9. The method according to claim 1, wherein said pseudo-random number i is calculated by said prover device according to $i=PRF_K(i)$, where PRF is a predetermined pseudo-random function and K is a regeneration key.

10. The method according to claim 1, wherein a cryptographic algorithm defining said one-way function $f$, said response y, and the relation between the secret key s and the public key V, is a variant of an algorithm called GPS (Girault, Poupard & Stern).

11. A portable device that exchanges data with a verifier device, and said portable device comprising an electronic circuit configured to execute, as a prover device, the method according to claim 1.

12. The portable device according to claim 11 comprising an RFID tag.

13. A verifier device that exchanges data with a portable device, comprising a data-processing device programmed for implementing the method according claim 1.

14. The verifier device according to claim 13, comprising an RFID-tag reader.

15. A digital-content storage medium reader comprising the verifier device according to claim 13.

16. A system for cryptographic authentication, comprising:
   a portable device;
   a verifier device; and
   digital-content storage medium, external to said portable device, that stores payload digital content and at least one reduced-coupon $x_i$ comprised in a coupon, wherein the coupon comprises, on one hand, a pseudo-random number $r_i$, where i is an index for labeling the coupon, and, on the other hand, a reduced-coupon $x_i$ such that $x_i = f(r_i)$, where f is a predetermined one-way function, and the digital-content storage medium receives an index i and sends the associated reduced-coupon $x_i$,
   wherein:
      the verifier device sends a challenge consisting of a random value c to the portable device,
      the portable device sends to the verifier device a response y calculated by using said pseudo-random number $r_i$, said challenge c, and a secret key s belonging to the portable device,
      the verifier device checks the validity of said response y based on the challenge c, a reduced-coupon $x_i$ corresponding to said pseudo-random number $r_i$, and a public key V corresponding to said secret key s, and
      the verifier device receives said reduced-coupon $x_i$ from the digital-content storage medium external to the portable device.

17. A non-transitory computer program product, comprising a computer readable medium having computer readable program code instructions embodied therein, which when executed by a processor, executes the method according to claim 1.

18. A computer program comprising program code embodied on a programmable data-processing device, wherein when said program is executed on said programmable data-processing device, said data-processing device performs the method according to claim 1.

19. The portable device according to claim 11, wherein the electronic circuit comprises an application-specific integrated circuit (ASIC).

* * * * *